Oct. 28, 1969　　　　W. STONE, JR　　　3,475,075
INSTRUMENTS PROVIDED WITH OPTICAL SYSTEMS AND MEANS FOR
ADJUSTING THEIR OPTICAL AXES
Filed March 30, 1964　　　　　　　　　　　　8 Sheets-Sheet 8
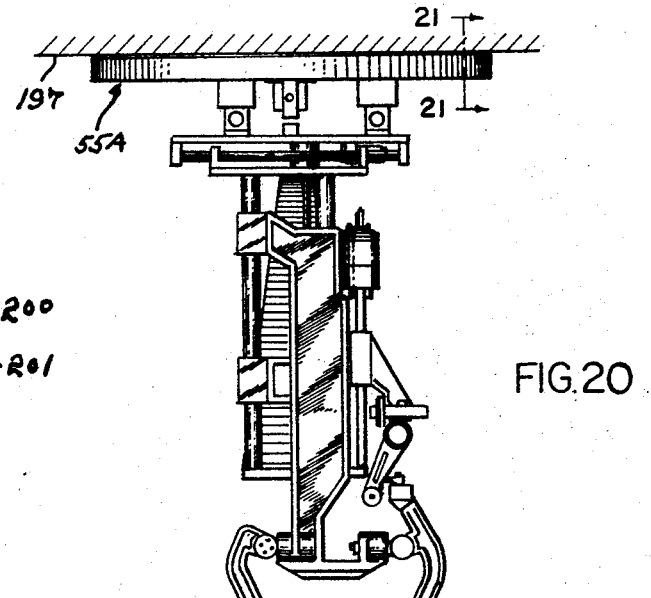
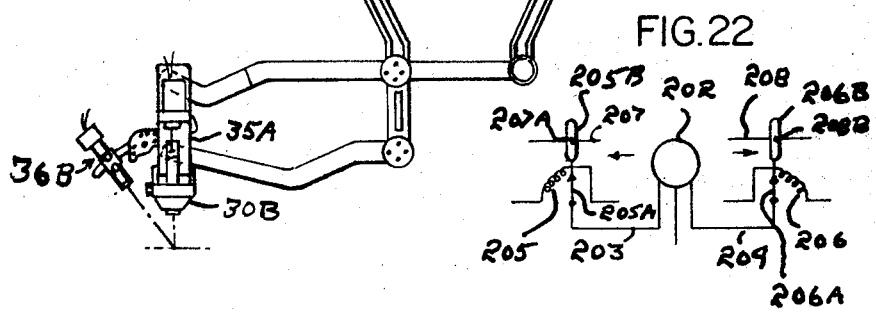
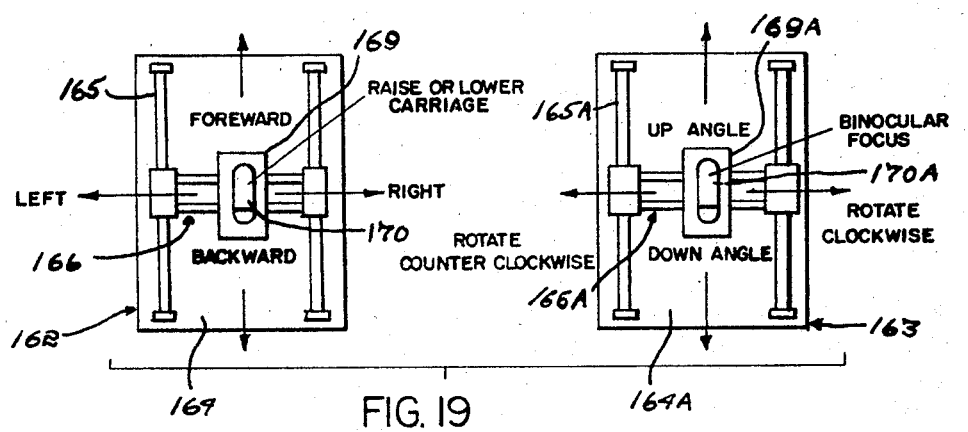
INVENTOR.
William Stone Jr.
BY
ATTORNEY United States Patent Office 3,475,075
Patented Oct. 28, 1969

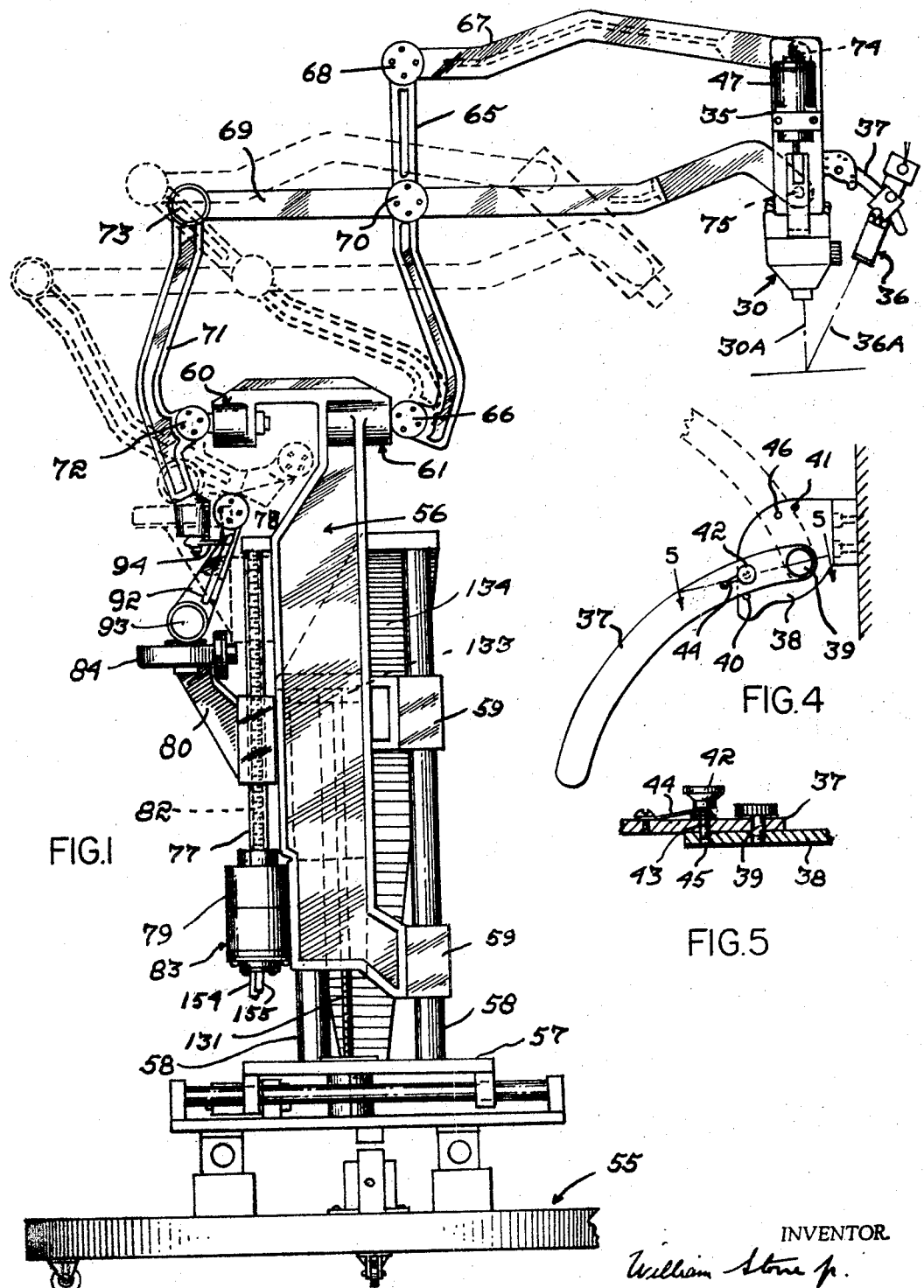

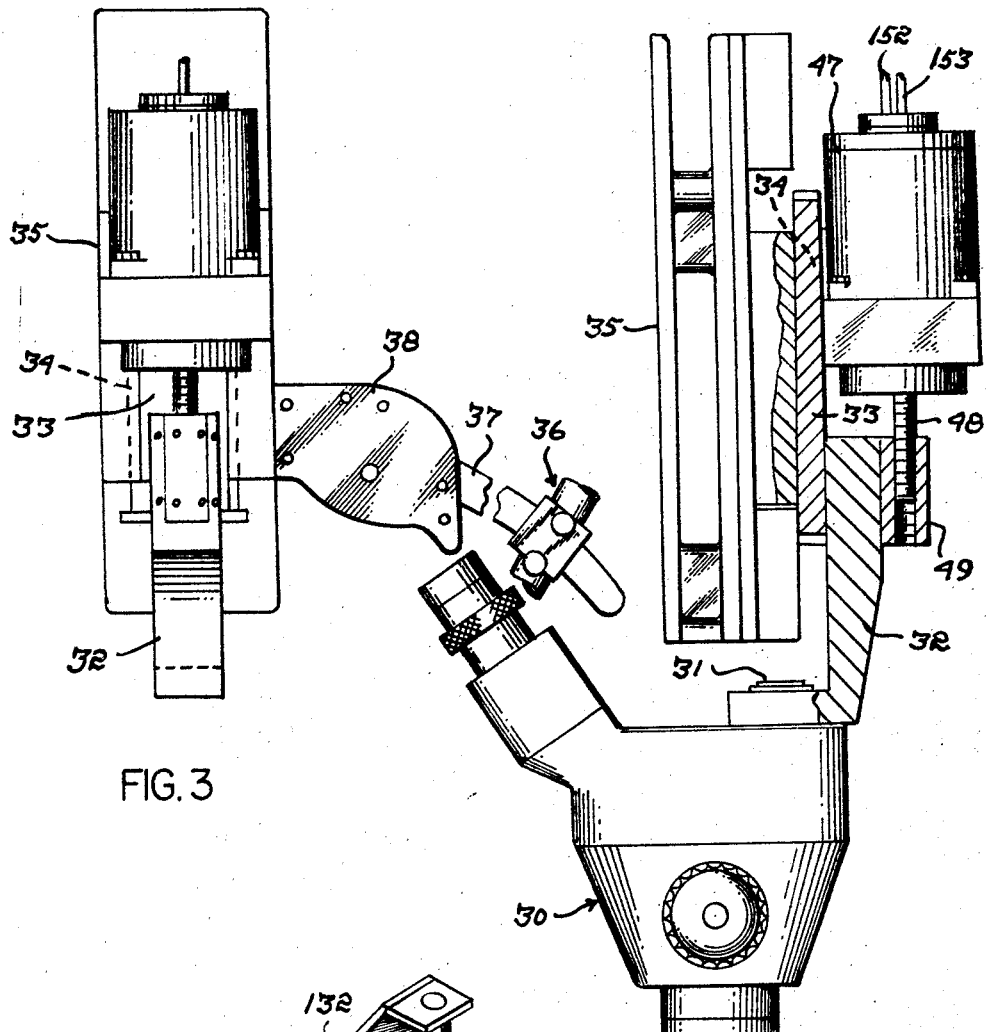
FIG. 3
FIG. 2
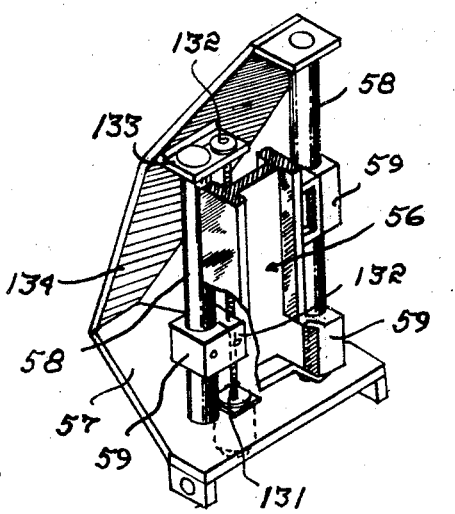
FIG. 6
INVENTOR.
William Stone jr.
BY
ATTORNEY

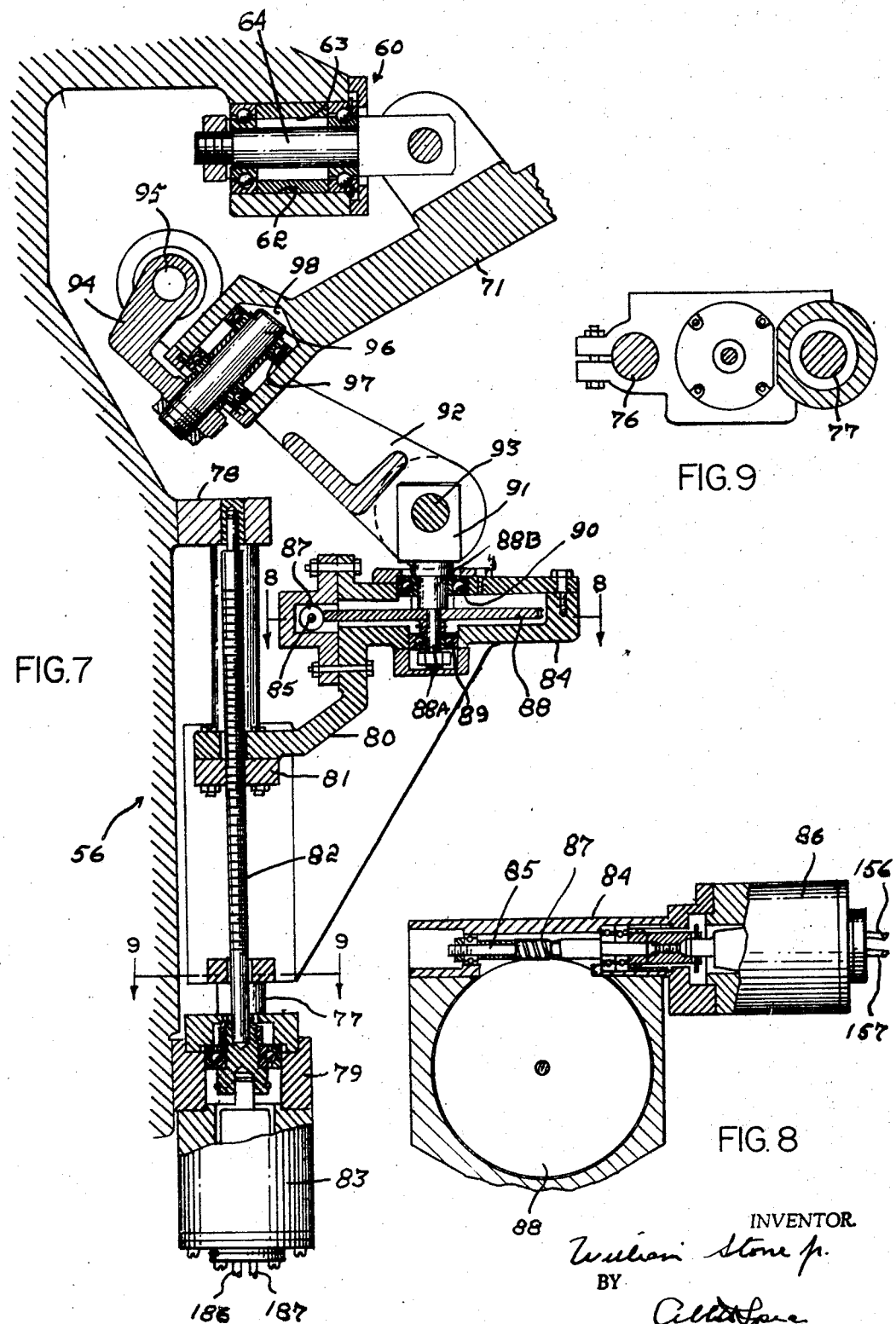

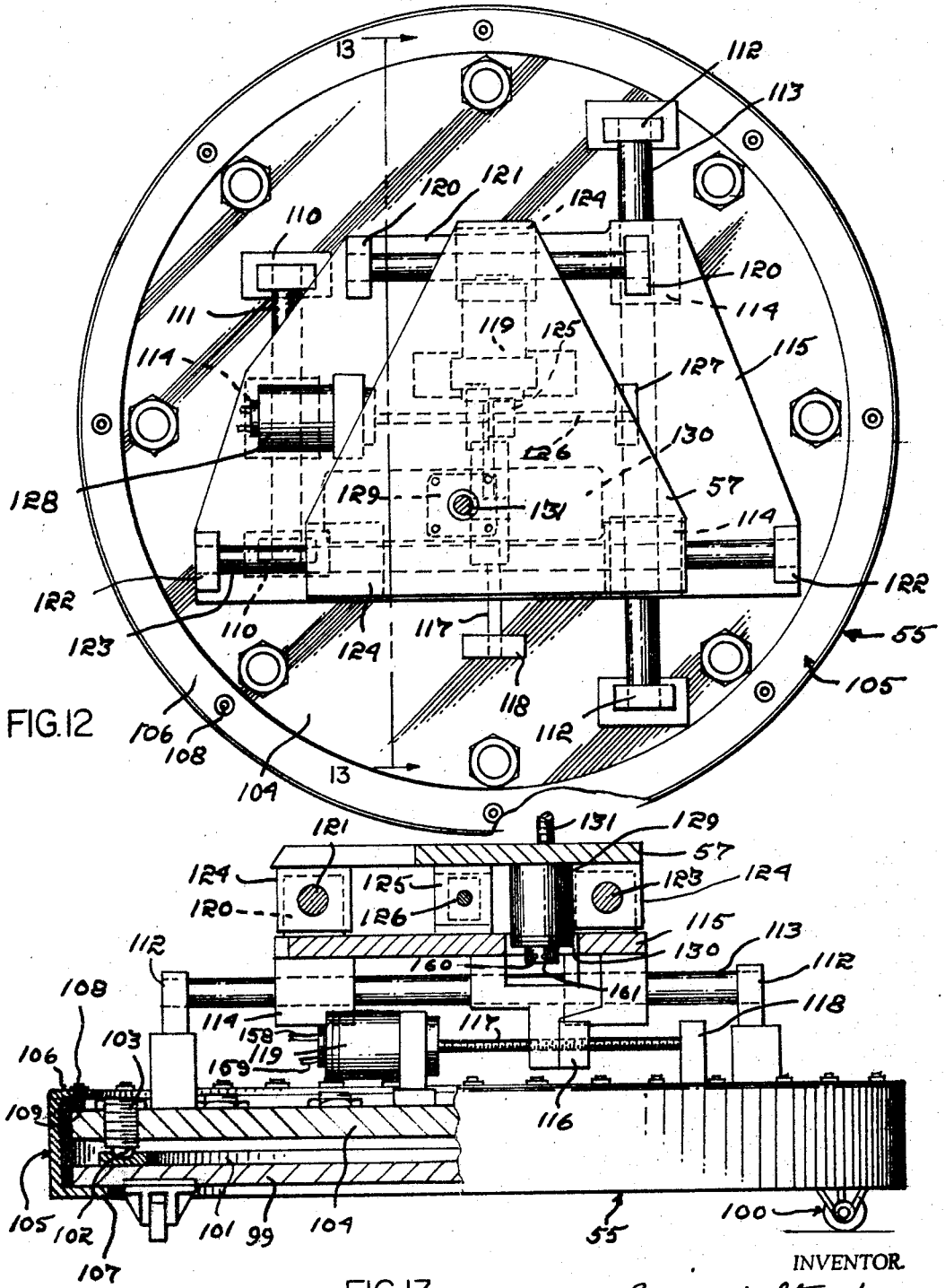

3,475,075
INSTRUMENTS PROVIDED WITH OPTICAL SYSTEMS AND MEANS FOR ADJUSTING THEIR OPTICAL AXES
William Stone, Jr., Boston, Mass.
(1434 Comstock Ave., Los Angeles, Calif. 90024)
Filed Mar. 30, 1964, Ser. No. 355,561
Int. Cl. G02b 7/24
U.S. Cl. 350—85         9 Claims

ABSTRACT OF THE DISCLOSURE

Instrument having an optical system whose optical axis is adjustable relative to the object to be examined, the adjustments being angular, vertical and laterally in any direction, the adjustments being effected by power operated means, preferably subject to foot operated controls.

This invention relates to instruments of the type that has at least one optical system whose optical axis must be precisely adjusted relative to the object to be examined.

While such instruments are well adapted for other uses, the novel features and advantages of the present invention may be best illustrated in connection with eye examinations and operations where the eye must be studied under magnification while suitably illuminated. For such purposes, magnifiers, usually binocular magnifiers or microscopes are used in conjunction with light sources, usually so called "slit" lamps or with lamps for a beam or with laser beams, with the optical axes of the two optical systems intersecting at the focal point of the former. As the surgeon's field of view through a binocular magnifier is necessarily small, the binocular magnifier must be shifted to permit the eye to be examined throughout a larger area.

It is necessary for the focussing adjustments of the binocular magnifier and its traversing adjustments to be made by the surgeon and it is desirable that such adjustments be made without interruption of the operation and without interference with the use of the surgeon's hands. In my United States Letters Patent No. 2,967,458, dated Jan. 10, 1961, there is shown an instrument of the above type enabling such adjustments to be made quickly, easily, and accurately by means of foot actuated controls.

It is often necessary or desirable for the surgeon to view the eye from a different angle, either in the same or a different position, and a principal objective of the invention is the provision of means to enable any oblique angular motion of the optical objective relative to the eye to be described, forwards, backwards, or sideways.

A specific objective of the invention is to accomplish changes in the angle of the optical axis by providing a support, parallel motion linkage including a link to which a unit having an optical system is connected and an actuating link connected between its ends by a pivotal connection to the support. Means connected to one end of the actuating link are operative to swing it, thereby to vary the angle of the optical axis of the unit relative to the eye or other object to which that axis is directed.

It is often also necessary or desirable to examine the eye from a different position and another principal objective of the present invention is the provision of an instrument having means by which an optical axis may be so moved as to generate a conical path whose apex is the focal point of the optical system, the optical objective being able to move through an arc of 360° while the operator's head remains approximately at a predetermined position relative to the arc.

A specific objective of the invention is to attain conical path generation by having the pivotal connection of the actuating link include a swivel whose axis is at right angles to that of the pivot and by using, either by itself or in conjunction with the angle changing means, means connected to the end of the actuating link to swing it through a conical path thereby to cause like motion of the unit supporting link. While the optical axis has a conical path, such movement does not change the general direction of the eye pieces when the unit includes a binocular magnifier or the like, so that the surgeon does not have to change his position to observe the eye from a different point of view.

As it is necessary that changes, such as those above referred to, be made quickly, easily, and accurately, the particular mechanisms by which they are effected are other general objectives of the invention.

Vertical adjustments of the unit are necessary and in accordance with the invention, this objective is attained by providing means for adjusting the unit vertically relative to the supporting link and means for adjusting the supporting link vertically relative to its base, the former, desirably, being focussing adjustments and the latter being positional adjustments, the arcuate motion of the optical objective and its oblique angular motion being possible in any vertical plane.

Because of the number of adjustments that are required, the adjustments above referred to and the adjustments in any direction in a plane that are necessary because the field of view of a binocular magnifier is small, an objective of the invention is to provide an instrument wherein there is a unit, a magnifier and a light source, carried by a support and a base for the support. The base may rest on a floor with the support extending upwardly or attached to the ceiling with the supports depending. Certain of the adjustments are of the unit relative to the support and the other adjustments are of the support relative to its base. A specific objective of the invention is to provide two contacts, one for the first named adjustments and one for the others and a further specific objective is to have the adjustments in any direction in a plane provided by means of a base including an upper plate to which the support is connected and which is movable in any direction in a plane relative to the fixed part of the base.

Another objective of the invention is concerned with the control of the power used to effect the various movements, the power being electricity or fluid under pressure, desirably air under pressure.

Yet another objective of the invention is that of providing foot actuated controls that require distinctly different foot motions and that are adapted for use in effecting as many as three different adjusting motions of the instrument.

In the accompanying drawings, there are shown illustrative embodiments of the invention from which these and other of its objectives, novel features, and advantages will be readily apparent.

In the drawings:

FIGURE 1 is a side elevation of an instrument in accordance with the invention,

FIGURE 2 is a fragmentary and partly sectioned view, on an increased scale, of the support, the binocular magnifier, and the adjustable connection therebetween, FIGURE 3 is an elevational view taken of the support and connection taken at right angles to FIGURE 2 to show the slit lamp.

FIGURE 4 is a side elevation of the slit lamp supporting arm,

FIGURE 5 is a section taken along the indicated lines 5—5 of FIGURE 4,

Figure 10:
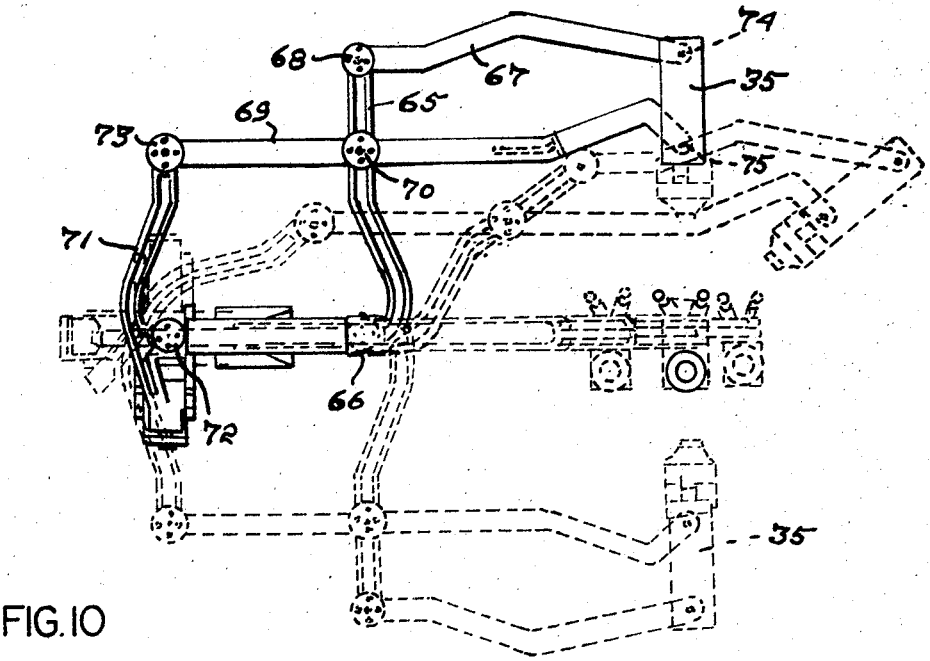
Figure 11:
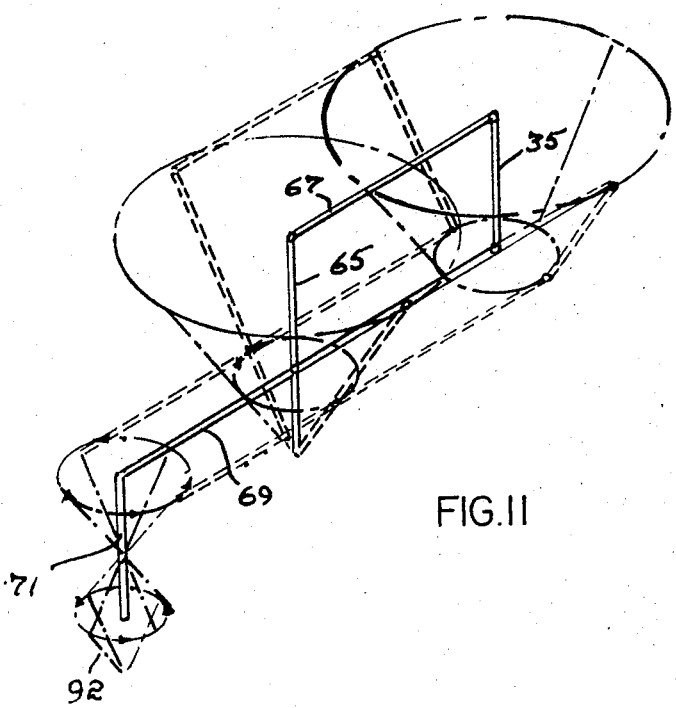
Figure 14:
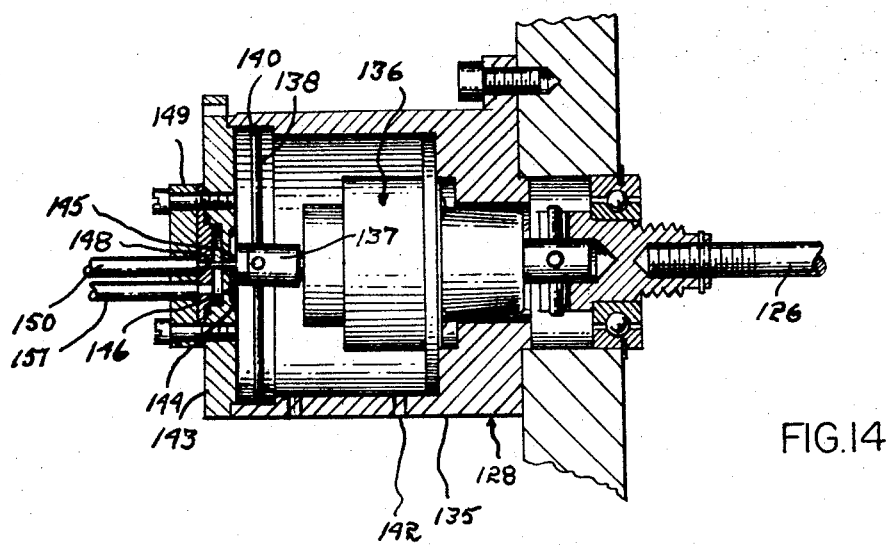
Figure 15:
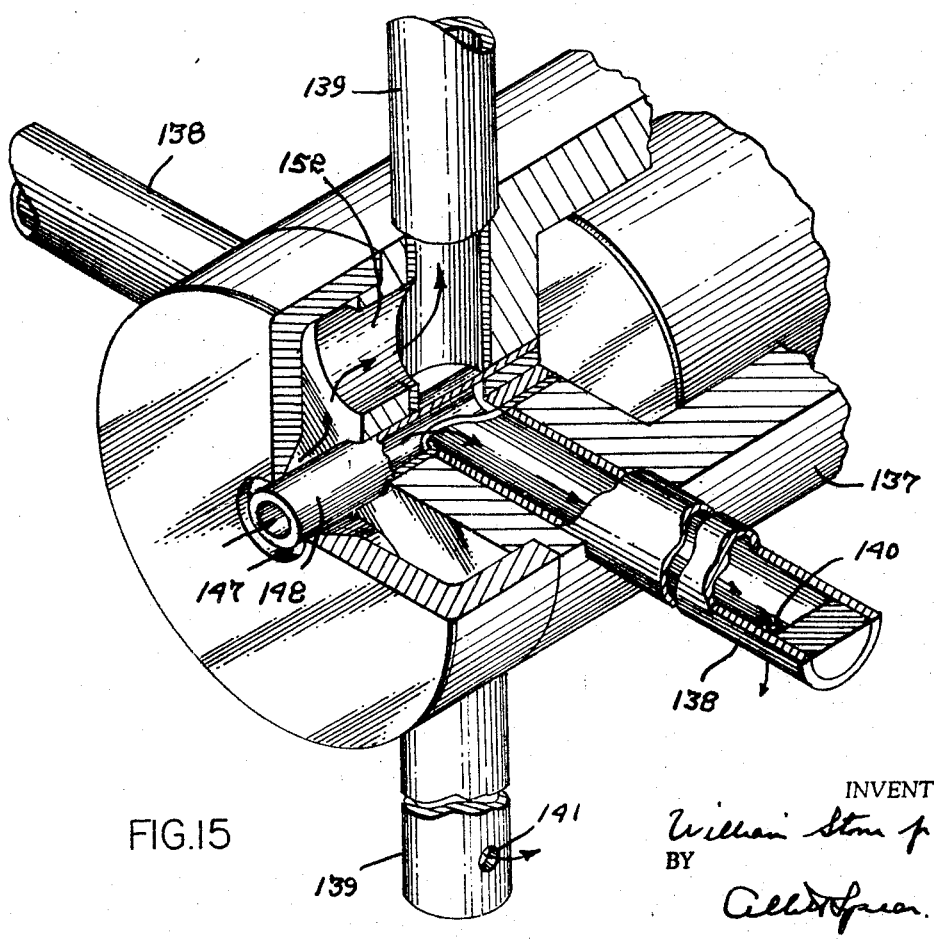
Figure 16:
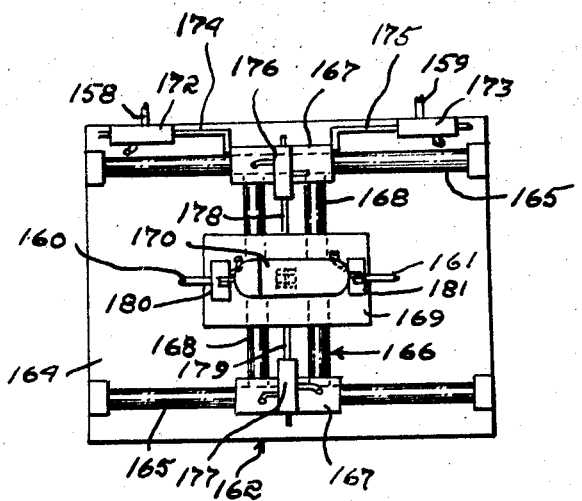
Figure 17:
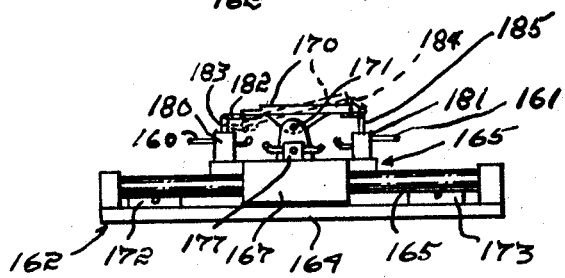
Figure 18:
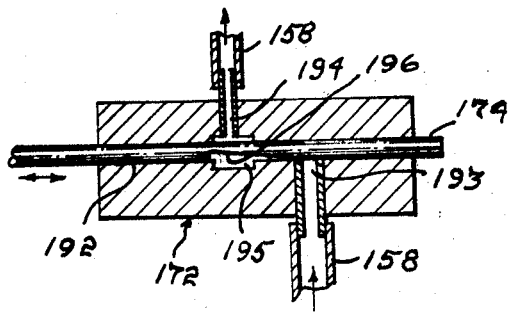

FIGURE 6 is a fragmentary section of the carriage and the top plate of the base, FIGURE 7 is a fragmentary, vertical section of the carriage, on an increased scale, showing the actuating means for the linkage, FIGURE 8 is a section taken approximately along the indicated lines 8—8 of FIGURE 7, FIGURE 9 is a section taken approximately along the indicated lines 9—9 of FIGURE 7, FIGURE 10 is a fragmentary perspective of the linkage with other positions being shown in broken lines, FIGURE 11 is a schematic view illustrating the pathways generated by the linkage, FIGURE 12 is a top plan view of the base, FIGURE 13 is a section taken approximately along the indicated lines 13—13 of FIGURE 12, FIGURE 14 is a longitudinally sectioned side view of an air motor assembly, FIGURE 15 is a partly sectioned side view of the air motor by itself on an increased scale, FIGURE 16 is a top plan view of one of the controls for three air motors, FIGURE 17 is a side view thereof, FIGURE 18 is a longitudinal section of a control valve, FIGURE 19 is a top plan view of both controls, each provided with legendry, FIGURE 20 is a view, similar to FIGURE 1 but illustrating an instrument mounted in a depending position, FIGURE 21 is a section taken approximately along the indicated lines 21—21 of FIGURE 20, and FIGURE 22 is a somewhat diagrammatic view of a motor control circuit illustrating the operation of the instrument by electricity.

In the embodiment of the invention illustrated by FIGURES 1–13, the instrument has a binocular viewer 30 which, see FIGURE 2, is connected by a vertical pivot 31 to a mount 32 having a portion 33 slidably within the undercut way 34 in the link 35. A slit lamp 36 is adjustable along the arcuate arm 37 of the link 35 with its optical axis 36A always intersecting the optical axis 30A of the binocular viewer 30 at the focal point thereof, see FIGURE 1.

The link 35 is shown, see FIGURES 4 and 5, as having a plate 38 to which the arm 37 is connected by a transverse pivot 39 for movement between the position of use in which it engages the stop pin 40 of the plate 38 into a raised, inoperative position in which it engages the stop pin 41. The arm 37 has a locking pin 42 slidable in a transverse bore 43 and yieldably backed by a seating spring 44 to enter the seat 45 in the plate 38 when the arm is in engagement with the stop pin 40 and to enter the plate seat 46 when the arm is in engagement with the stop pin 41.

Means are provided to raise and lower the binocular viewer 30 and its slit lamp 36 relative to the link 35. Such means are shown in FIGURE 2 as consisting of an air motor 47 mounted on the link 35 with its shaft 48 threaded through the fixed nut 49 with which the slidable mount 32 is provided.

The instrument also includes a base, generally indicated at 55, a carriage 56 supported by the base for movement vertically with respect thereto and for movement in any direction in a plane transversely thereof, and linkage connecting the link 35 to the carriage 56 and operable to so move the link 35 that the axis 30A of the binocular magnifier 30 generates a cone, see FIGURE 11, and to so adjust the linkage that the angle of the axis 30A may be varied as desired. The base 55 will subsequently be detailed but it is here noted that it includes a plate 57 provided with a pair of vertical columns 58, see FIGURES 1 and 6, extending through the guide blocks 59 of the carriage 56 enabling the height of the carriage and, accordingly, the height of the binocular magnifier 30 relative to the base 55 to be adjusted by means later to be described.

At the upper end of the carriage 56 there are a pair of generally indicated swivels 60 and 61 whose axes are in transverse alinement. As the swivels are substantially identical, only the swivel 60 is shown in detail, see FIGURE 7, wherein the carriage 56 is shown as having a bore 62 for a ball bearing assembly 63 in support of a shaft 64.

A link 65 is pivotally connected at its lower end, as at 66, to the shaft of the swivel 61, at its upper end to one end of a link 67 by a pivotal connection 68, and, between the pivotal connections 66 and 68, to an intermediate part of a link 69 by a pivotal connection 70. An intermediate part of the actuating link 71 is pivotally connected as at 72 to the shaft of the swivel 60 with its upper end connected to one end of the link 69 by a pivotal connection 73. The links 67 and 69 are pivotally connected as at 74 and 75, respectively, to the supporting link 35.

It is to be noted that the distance between the pivots 66 and 70 is the same as the distance between the pivots 72 and 73 and that the distance between the pivots 66 and 72 is equal to that between the pivots 70 and 73. It is also to be noted that the distance between the pivots 68 and 70 is the same as that between the pivots 74 and 75. In addition, the distance between the pivots 68 and 74 is the same as that between the pivots 70 and 75.

As a consequence, if the actuating link 71 is rocked, corresponding rocking or angle-changing movement of the supporting link 35 results and, since the pivots 66 and 72 are parts of the swivels 61 and 60, respectively, the supporting link 35 may be made to have frusto-conical paths and the means for so doing will now be described.

A pair of vertical columns 76 and 77 extend at one side of the carriage 56, between an upper shoulder 78 and a lower shoulder 79. The two columns 76 and 77 may be seen in FIGURE 9 and the shoulders 78 and 79 in FIGURE 7. A bracket 80 is slidably supported by the columns 76 and 77 and includes a fixed nut 81 through which is threaded a shaft 82 adapted to be rotated in either direction as by a generally indicated air motor 83 carried by the lower bracket 79.

The bracket 80, see FIGURE 7, supports a housing 84 in which there is mounted a transverse shaft 85 adapted to be rotated in either direction as by an air motor 86. The shaft 85 is provided with a worm gear 87 in mesh with a gear 88 having its shaft ends 88A and 88B supported by vertically spaced bearing units 89 and 90, respectively. The shaft end 88B includes a block 91, held between one forked end of a link 92 by a pivot 93. An arm 94 is held between the other forked end of the link 92 by a pivot 95. The arm 94 has a stub shaft 96 entrant of a ball bearing unit 97 seated in a socket 98 in the lower end of the actuating link 71.

With the structure as thus far described, turning the gear 88, as by the associated air motor 86, swings the link 92 along a conical pathway thereby to swing the arm 71 along a similar pathway and these pathways may be 360° in arcuate extent. It will be noted that such movement of the supporting link does not change the general direction of the eye piece of the binocular magnifier 30 so that the viewpoint of the surgeon may be changed without any appreciable change in his position.

If it is desired to vary the angle of the optical axis 30A of the binocular magnifier, the shaft 82 is turned as by the associated air motor 83 in one direction to raise the bracket 80 thereby to increase the diameter of the generated cone, vice versa to decrease it. As such changes are attended by a change in height of the generated conical pathway and, accordingly, a change in the focal point, it is necessary to provide compensation as by raising or lowering the binocular viewer 30 as by means of its air motor 47.

The base 55, see FIGURES 12 and 13, has a bottom disc 99 provided with casters 100 and a race 101 on its upper surface for ball bearings 102. Each ball bearing 102 is held by a holder 103 adjustably threaded through a plate 104. The disc 99 and the plate 104 are held together as a unit by a marginal holder 105 having inturned flanges 106 and 107, the flange 106 overlying the plate 104 and provided with vertically adjustable threaded holders 108 for maintaining ball bearings 109 in contact with the upper surface thereof.

The plate 104 has a pair of supports 110 for the rod 111 and a pair of supports 112 for the rod 113. The rods 111 and 113 are parallel and extend through slidable guide blocks 114 on the undersurface of a plate 115 which has a fixed nut 116 receiving a threaded shaft 117 journalled in one end in a bearing 118 on the plate 104 and adapted to be rotated in one direction or the other as by an air motor 119 also mounted on the plate 104.

The intermediate plate 115 has a pair of supports 120 for the rod 121 and a pair of supports 122 for the rod 123. The rods 121 and 123 are parallel and extend through the guides 124 of the top plate 57 which has a fixed nut 125 through which is threaded a shaft 126 having its free end journalled in a bearing 127 and adapted to be rotated in either direction as by an air motor 128 on the plate 115.

The top plate 57 supports an air motor 129 on its undersurface and, because of its size, the intermediate plate 115 is slotted as at 130 to permit the plate 57 to move relative thereto. The shaft 131 of the motor 129 extends upwardly between and parallel to the columns 58 and through a threaded bore in one of the carriage guide blocks 59 thus to enable the carriage to be raised and lowered. The upper end of the shaft 131 is journalled at 132 in the flange 133 of a shield 134. See FIGURES 1 and 6.

While the air motors 47, 83, 86, 119, 128, and 129 may be of conventional type, reference is now made to FIGURES 14 and 15, wherein a preferred air motor construction is shown. As the several air motors may be identical, only the air motor 128 is detailed.

The air motor 128 has a housing 135 in which there is a bearing assembly 136 to which the shaft 126 and the hub 137 are connected. The hub 137 has a first pair of radially disposed, tubular blades 138 and a second pair of radially disposed tubular blades 139. The blades 138 are diametrically opposed and each has a port 140 opening to cause rotation in one direction and the blades 139 are each disposed at right angles to the blades 138 and each has a port 141 opening to cause rotation in the opposite direction.

The housing 135 has outlets 142 and the interior of its end wall 143 has an annular recess 144 concentric with an axial port 145 and providing an annular shoulder 146 engaged by the proximate end of the hub 137 which has an axial port 147. A conduit 148, in communication with the interiors of the blades 138, extends freely through the ports 145 and 147. A head 149, secured to the housing end wall 143, places a first air supply conduit 150 in communication with the conduit 148 and a second air supply conduit 151 in communication with the interiors of the blades 139 via ports 152 within the hub 137. It will thus be apparent that the air motor 128 may be controlled to rotate its shaft 126 in either direction by means of valves in its supply conduits 150 and 151.

The air motor 47 has air supply conduits 152 and 153, the air motor 83 has air supply conduits 154 and 155, the air motor 86 has air supply conduits 156 and 157, the air motor 119 has air supply conduits 158 and 159, and the air motor 129 has air supply conduits 160 and 161.

As it is important that the valve controls be capable of being operated by the feet of the surgeon, they are grouped into two units, the generally indicated foot control 162 and the generally indicated foot control 163, see FIGURE 19, and as these may be identical, only the control unit 162 will be detailed, see FIGURES 16–18.

The foot control 162 has a base 164 supporting parallel rods 165 slidably supporting a carriage member, generally indicated at 166, and including ends 167 slidable on the rods 165 and interconnected by parallel rods 168 disposed at right angles to the rods 165. A carriage member 169 is slidable on the rods 168 and has a treadle 170 pivoted thereto as at 171.

On the base 164 there is a pair of generally indicated valves 172 and 173, the valve 172 in control of the air line 158 and the valve 173 in control of the reversing air line 159 by which lines the air motor 119 is operated to move the carriage 56 in one direction transversely of the base 55. The valves 172 and 173 are located adjacent opposite ends of the base 164 and the operating stems 174 and 175 of the valves 172 and 173, respectively, are connected to the carriage member 166 and extend in opposite directions.

The carriage member 166 carries valves 176 and 177, each on a respective one of its ends 167, the valve 176 in control of the air conduit 150 and the valve 177 in control of the reversing air conduit 151 by which lines the air motor 128 is operated to move the carriage 56 transversely of the base 55 at right angles to the movement effected by the operation of the air motor 119. The carriage member 169 is provided with oppositely disposed, valve operating stems 178 and 179 for the valves 176 and 177 respectively.

The carriage member 169 is provided with valves 180 and 181 which are located at opposite ends thereof, the valve 180 being in control of the air line 160 and the valve 181 in control of the reversing air line 161, the two lines supplying the air motor 129 by which the carriage 56 is raised vertically with respect to the base 55. The treadle 170 has a link connection 182, at one end, with the valve stem 183, and a link connection 184, at its other end, with the valve stem 185.

The valve control 163 is similar except that its base 164A, see FIGURE 19, supports the valves, not shown, but similar to the valves 172 and 173, controlling the delivery of air to the air motor 83 via the conduit 186 or the conduit 187, see FIGURE 1, as the carriage member 166A is slid in one direction or the other endwise relative to the base, thereby controlling the arcuate travel of the link 35 and the binocular magnifier 30 supported thereby.

The carriage member 166A carries a pair of valves, not shown but similar to the valves 176 and 177, controlling the delivery of air to the air motor 86, via the conduit 156 or the conduit 157, see FIGURE 8, as the carriage member 169A is slid in one direction or the other, sidewise relative to the base, thereby controlling the angular position of the link 35 and accordingly, the binocular magnifier 30.

The carriage member 169A is provided with a pair of valves, not shown, but similar to the valves 180 and 181 for controlling the delivery of air to the air motor 47, via the conduit 152 or the conduit 153, see FIGURE 2, as the treadle 170A is rocked in one direction or the other thereby to control the focusing of the binocular magnifier 30.

As the several valves by which the flow of air to the air motors may be identical, only one, the valve 172 is detailed, see FIGURE 18. The valve 172 has a bore 192 slidably receiving the stem 174 which normally blocks the inlet port 193 from the outlet port 194 which is axially spaced therefrom. The bore 192 includes a chamber 195 and the stem 174 has an elongated notch 196 tapering with its depth decreasing towards the inlet port 193. With this construction, the valve 172 may be "cracked" to provide slow operation of the air motor 119 or opened wider to increase the speed thereof.

It will be appreciated that an instrument in accordance with the invention may be supported to depend from overhead structures, a ceiling 197, for example, see FIGURES 20 and 21.

The instrument shown in FIGURE 20 will not be detailed as it is substantially identical to that described except that its link 35A is the reverse of the link 35, as is the direction of movement of the several air motors to accomplish movements of the binocular magnifier 30B and the associated lamp 36B corresponding to those provided by the instrument whose description has been detailed. Its base 55A, however, includes a plate 99A anchored to the ceiling and a plate 198 connected to the plate 99A by ball bearings 199 seated in holders 200 threaded through the overlying flange 201 of the plate 198. The plate 198 corresponds to the plate 104 of the base 55.

It will be apparent that reversible electric motors may be substituted for the air motors and the foot operated controls may be readily changed when an electrical basis of operation is desired. In FIGURE 22, a reversible motor 202 is shown that may be substituted for any of the air motors. The reversible motor 202 has leads 203 and 204, one for effecting rotation in one direction and one for effecting rotation in the opposite direction.

The leads 203 and 204 include rheostats 205 and 206, respectively, each to operate by a control movement of a control unit. As illustrative of such, slidable stems 207 and 208 are shown and these are the equivalent of the valve stems of any pair of valves of either control unit and operated in the same manner. The rheostat 205 has its contact arm 205A including a non-conductive portion 205B slotted to receive the pin 207A of the stem 207 and the contact arm 206A of the rheostat 206 has a like non-conductive, slotted portion 206B receiving the pin 208A of the stem 208. Both rheostats are closed in the neutral position and only one is in circuit when the treadle or carriage member, which ever is in control thereof, is moved in either direction from its neutral position.

It will thus be apparent that instruments in accordance with the invention are well adapted to ensure the surgeon of a wide range of accurate controls of the magnifier, and of the illuminating means, if such be used therewith.

I claim:

1. An instrument comprising a unit having an optical system, motion transmitting means of a type including first, second and third parallel members, a first link pivotally connected to all three members, and a second link parallel to the first link and connected to the second and third members and wherein the movement of the one member effects similar movement of the other members in a plane, said unit being connected to said third member wherein the optical axis of the system is tiltable with respect to the focal point of said unit in said plane, a support, means attaching said first and second members to said support whereby said unit is spaced laterally thereof, said attaching means including first pivot means operable by a first adjusting means to enable one of said first two members to be actuated to effect variations of said tilt in said plane and second pivot means having its pivotal axis at right angles to the pivotal axis of the first pivot means and operable by second means to swing said motion transmitting means transversely of said tilt plane whereby the angular relationship between said plane and said focal point is conically varied.

2. The instrument of claim 1 in which the optical system is adjustably connected to the unit for vertical movement relative thereto and the unit includes a power operated device connected to the system for effecting such vertical movements.

3. The instrument of claim 2 in which the unit also includes a lamp whose light axis intersects the optical axis of the system, the optical system being movable relative to the lamp.

4. The instrument of claim 1 in which the support includes a base and means connecting the support to the base for movement along two paths disposed at right angles to each other.

5. The instrument of claim 1 in which one of the first two members includes a free end portion, the first adjusting means includes a power operated device, a bracket movable vertically thereby, a rotatable member carried by the bracket, an actuating link pivotally connected at one end to the rotatable member at the axis thereof, an arm pivotally connected to the other end of the link, and a pivotal connection between the arm and the free end portion of the first member disposed at right angles to the pivotal connection between the arm and the actuating link, and the second adjusting means includes a power operated device attached to the bracket and having a driving connection with the rotatable member.

6. The instrument of claim 1 in which the support includes a base, adjustable means connecting the support to the base and including a first part, an adjustable connection between the base and the first part including a power operated device and operable to effect movements of the first part transversely relative to the base in one direction, a second part, an adjustable connection between the first and second parts including a power operated device and operable to effect movements of the second part transversely relative to the base in a direction at right angles to the first named direction, and a connection between the second part and the support.

7. The instrument of claim 6 in which the connection between the second part and the support is vertically adjustable and includes a power operated device operable to effect such vertical adjustments.

8. The instrument of claim 2 in which each power operated device is reversible and includes a pair of directional controls, and a control unit for the three power operated devices comprising a first support including a slideway, a second support connected to the slideway and including a second slideway disposed at right angles to the first slideway and a third support in the form of an operating control centrally pivoted to the second support, the controls for each power operated device being mounted on a support on opposite sides of an intermediate position of the support movably connected thereto, and connections between the two controls for each power operated device and the support movable relative thereto for operation in the alternative depending on the movement of that support relative to its intermediate position.

9. The instrument of claim 2 in which the support includes a base, means connecting the support to the base and including a first part, an adjustable connection between the base and the first part including a power operated device operable to effect movement of the first part transversely relative to the base in one direction, a second part, an adjustable connection between the first and second parts including a power operated device operable to effect movement of the second part transversely relative to the first part in a direction at right angles to the first named direction, a vertically adjustable connection between the second part and the support including a third power operated device and operable to effect vertical adjustments of the support relative to the second part, each power operated device is reversible and includes a pair of directional controls, and two control units, each control unit for three power operated devices comprising a first support including a slideway, a second support connected to the slideway and including a second slideway disposed at right angles to the first slideway, and a third support in the form of an operating control centrally pivoted to the second support, the controls for each power operated device being mounted on a support on opposite sides of an intermediate position of the support movably connected thereto, and connections between the two controls for each power operated device and the support movable relative thereto for operation in the alternative depending on the movement of the support relative to its intermediate position, the three power operated devices for one control being those effecting movement of the optical system relative to the support and the three power operated devices for the other control being those effecting movement of the support relative to the base.

References Cited

UNITED STATES PATENTS

| | | |
|---|---|---|
| 2,493,770 | 1/1950 | Manning. |
| 2,967,458 | 1/1961 | Stone _____ 350—71 |
| 3,044,346 | 7/1962 | Fieux _____ 350—85 X |
| 3,201,795 | 8/1965 | Cuppers et al. _____ 351—38 |
| 2,570,026 | 10/1951 | Delaney. |
| 3,356,437 | 12/1967 | Beamish _____ 350—85 |

FOREIGN PATENTS

| | | |
|---|---|---|
| 1,127,089 | 12/1956 | France. |
| 1,316,033 | 12/1962 | France. |

DAVID SCHONBERG, Primary Examiner

PAUL R. GILLIAM, Assistant Examiner

U.S. Cl. X.R.

350—81, 84; 351—38